United States Patent [19]

Bright, Sr.

[11] 4,143,820

[45] Mar. 13, 1979

[54] EMITTER FOR DRIP IRRIGATION SYSTEMS

[76] Inventor: Elvin M. Bright, Sr., 17242 Bircher St., Granada Hills, Calif. 91344

[21] Appl. No.: 775,592

[22] Filed: Mar. 8, 1977

[51] Int. Cl.² ............................................ B05B 15/00
[52] U.S. Cl. .................................... 239/108; 239/542; 239/570; 137/238; 137/852; 138/46
[58] Field of Search ...................... 239/107, 108, 533.1, 239/542, 570, 571; 137/238, 517, 852; 138/46

[56] References Cited

U.S. PATENT DOCUMENTS

| | | | |
|---|---|---|---|
| 886,834 | 5/1908 | Michelin | 138/46 X |
| 2,899,981 | 8/1959 | Binks | 138/46 |
| 3,918,646 | 11/1975 | Leal-Diaz et al. | 239/542 X |
| 3,970,251 | 7/1976 | Harmony | 138/46 X |
| 4,004,609 | 1/1977 | Fabry et al. | 138/46 X |
| 4,009,832 | 3/1977 | Tiedt | 239/542 |

FOREIGN PATENT DOCUMENTS 1217791  5/1960  France ..................................... 137/517

Primary Examiner—Robert W. Saifer
Attorney, Agent, or Firm—Fraser and Bogucki

[57] ABSTRACT

A temperature insensitive, low cost, pressure regulating and remotely flushable emitter for drip irrigation systems comprises a nodal body insertable into the wall of a pipe and having an end face aperture in which a deflectable resilient element responds to interior water pressure changes. The resilient element is deflectable normally to the plane of the end face, and provides at least one edge surface in facing, shearing relation to the end face aperture wall. In a first mode, one or more slit apertures decrease in area in response to increases in interior water pressure within a nominal operating range. When the pressure is raised further, however, the resilient element is deflected across the end face aperture wall, to define at least one slit aperture providing a low volume but high velocity flow which creates a flushing or cleaning action. In a preferred form of structure, the end face of the nodal body is substantially parallel to the flow direction in the pipe and is thicker than the resilient strip, which has at least a double curvature that provides controlled deflection. Water flow along the pipe and the short path length through the aperture tend to prevent clogging, reducing the need for filtration equipment. The emitter is small in size, being less than one-half inch in diameter, is firmly seated within the pipe, is readily manufactured to precise specifications in high volume, and may be easily inserted and replaced.

33 Claims, 10 Drawing Figures

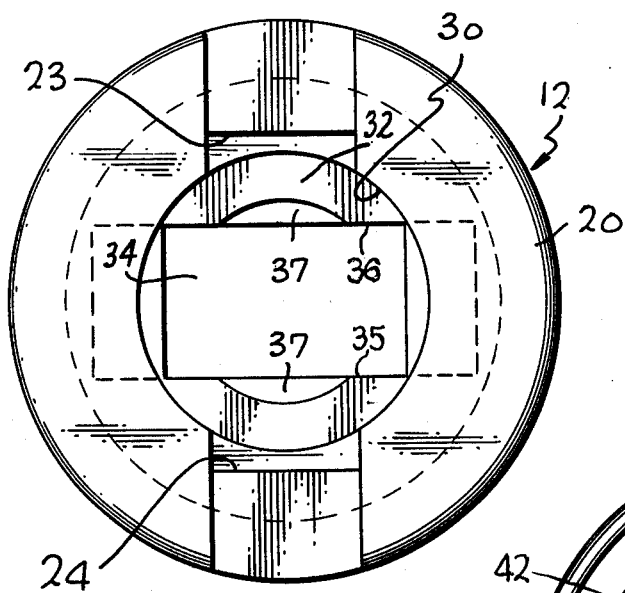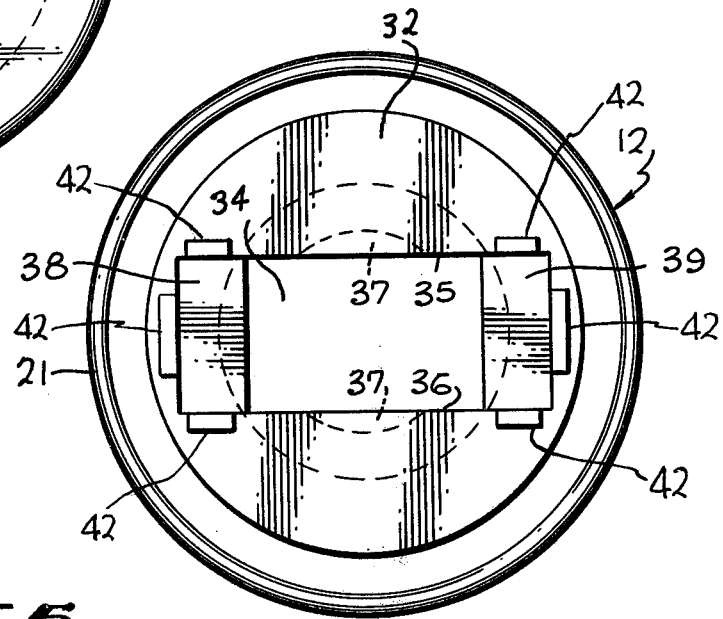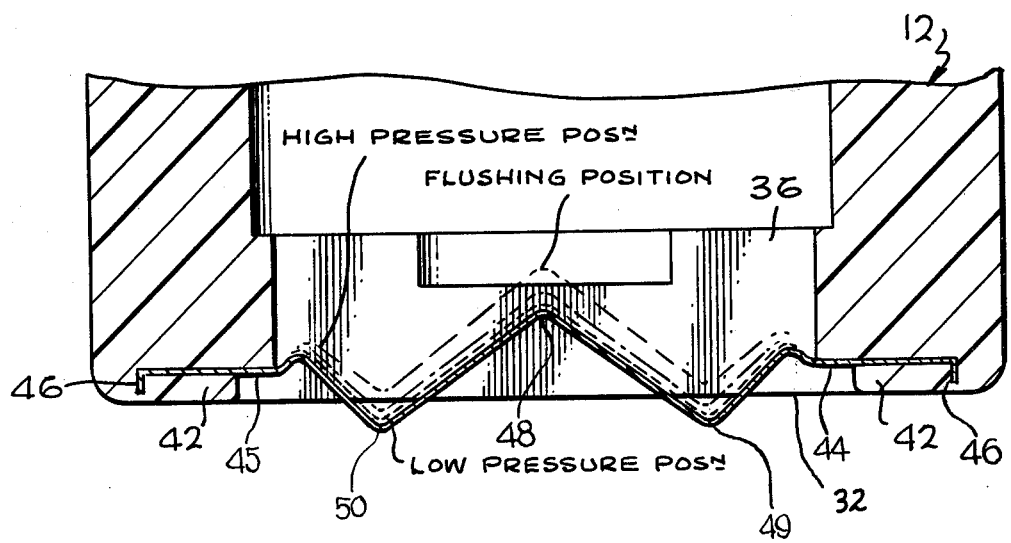

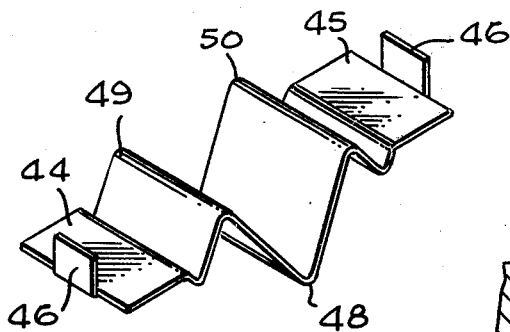
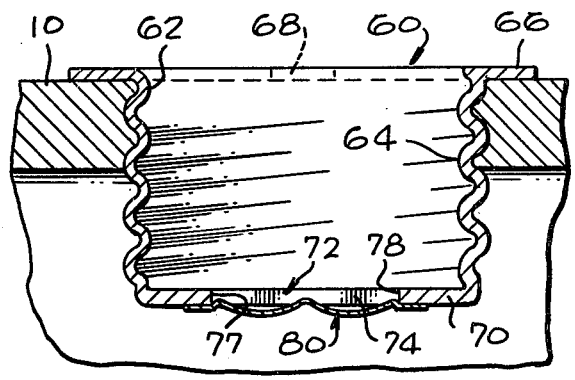
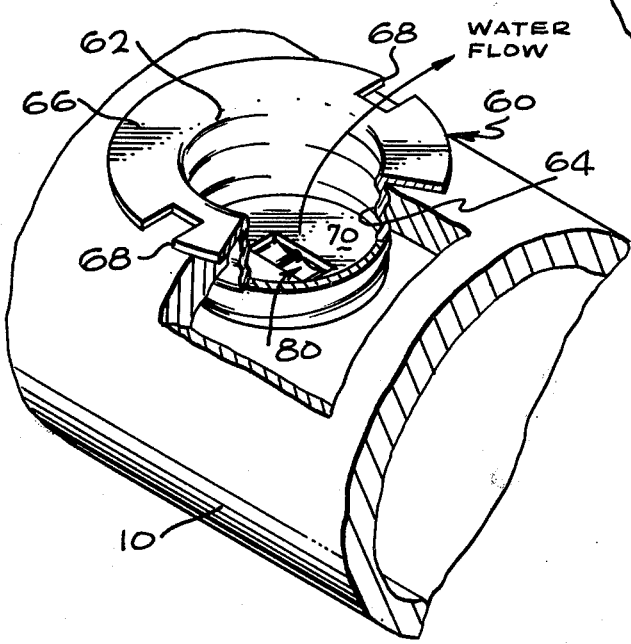
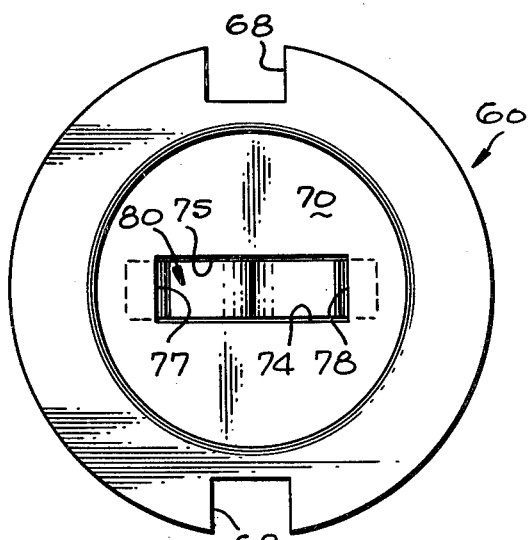
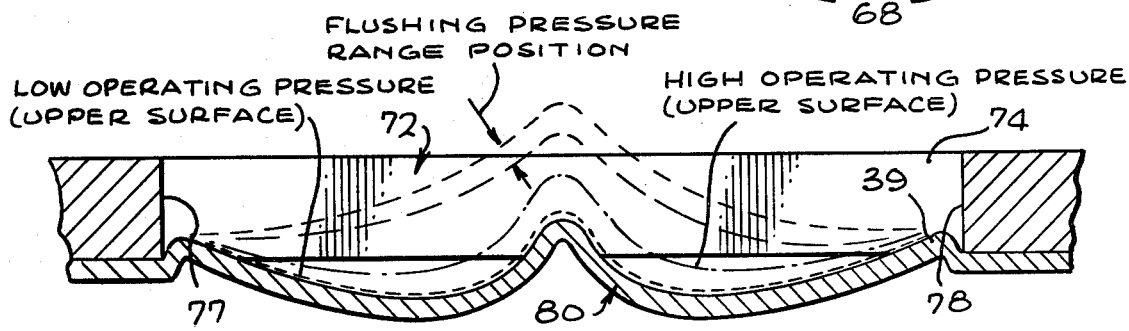

EMITTER FOR DRIP IRRIGATION SYSTEMS

BACKGROUND OF THE INVENTION

This invention relates to emitters for drip irrigation systems, and more particularly to pressure compensating emitters.

Drip or trickle irrigation systems have come into widespread use, particularly for arid, semi-arid and other environments in which irrigation is employed, because it has been shown that for various crops and plant life, such systems can provide either a substantial savings in water usage, increased growth rate, or both. Numerous valve or emitter designs have been attempted or adopted, and most are based upon the principle of reducing the flow volume to a selected low rate of flow by introducing long or multiple constricted paths through which the water must pass. These emitters are generally made wholly or in substantial part of plastic, are bulky and subject to damage, and while some may be removed for cleaning, this in itself is usually a time consuming and tedious procedure. In addition to these disadvantages, present systems are inordinately subject to clogging unless filtration is used, to the extent that most large scale systems are designed on the inherent assumption that filtration is required. Additionally, most commercial emitters today are inherently static devices with respect to the pressure range in which they will operate satisfactorily. In large scale agri-business today, however, it is common to desire to use long pipe lengths (e.g. 1000 ft.), and to be required to follow a variable land contour. The pressure differences arising from line lengths in excess of about 300 ft. and changes in elevation can each cause the static emitters to provide widely and unacceptably varying rates of flow. To overcome these variations it is necessary to use both pressure regulating equipment and extensive header installations.

Attempts have been made to confront individual ones of the different problems separately. For example, a number of designs of pressure compensating emitters have been patented, typically derived from the designs of pressure regulators utilized in large conventional piping systems. Other attempts have been made at providing flushing features, and at minimizing the problems of emitter clogging. It is clear, however, that no one has yet conceived an emitter which is capable of satisfying all these requirements, and at substantially lower cost than existing emitters, while also being so small in size and so rugged in structure that it can be utilized with automatic handling equipment. Most present emitters are relatively bulky (e.g. 2" or more in one dimension), or when configured for in-line mounting cannot readily be replaced. Further, no emitters are known, as far as can be ascertained, that can provide low feed rates (e.g. 1 quart per hour) at pressures normally available in service.

SUMMARY OF THE INVENTION

Emitter structures in accordance with the invention comprise small elements insertable within apertures in the pipe wall and including an apertured interior end face, within which a resilient element responsive to water pressure is variably deflected to provide apertures of varying cross-sectional area. A shearing valve action is established between parts of the resilient element and the adjacent aperture wall or walls such that slit apertures are formed that decrease in size with increasing pressure so as to maintain uniform flow rates. With a further increase in pressure, however, a part of the resilient element may be deflected across the depth of the adjacent interior wall, to define one or more flushing flow apertures through which high velocity but low volume cleaning jets are created.

Emitters in accordance with the invention are low profile elements that form a seal with the pipe exterior and may be retained in place by a removable clamping ring. Because the valve structure is interior to the pipe, substantially parallel to flow direction within the pipe, and because the flow path through the apertures is short and direct, the emitter is particularly free from clogging and responsive to different types of flushing action.

In a more specific example of a preferred structure in accordance with the invention, a nodal cylindrical body is molded of synthetic resin to include an inner end face having a rectangular aperture with parallel sides, a central bore through which water flows, and an outer end flange with a curved peripheral lip and inset shoulders facing the central bore. The wall comprising the end face is of predetermined thickness, and may include a central inset of chosen depth adjacent the aperture. A coextensive resilient strip having at least a double curvature along its length is mounted so as to span and substantially enclose the aperture. In response to changes in pressure acting upon the interior surfaces of the resilient element, the resilient element deflects, and its side edges move in a shearing valve action relative to the side walls of the aperture. In a chosen operating pressure range, nodal segments of the strip protrude beyond the aperture wall (in the inner direction relative to the pipe) to provide variable size slit apertures through which water flows at substantially constant rates. Deflection of the strip varies the cross-sectional areas of the slit apertures to compensate for pressure variations, both static and dynamic. The strip configuration enables deflections to be absorbed solely in changes of curvature so as to give accurate, reproducible flow rates over a selected operating range, typically 10-40 psi. At the upper limit of this range the strip may fully close off the apertures. However, if the pressure is further raised at least one nodal segment in the strip again protrudes beyond the aperture walls, this time in the outer direction, to define at least one small flushing aperture. A high velocity but low volume jet flow is created that cleans the emitter but the pressure drop is so low that an array of emitters may be flushed concurrently without requiring high pumping pressures.

The outer flange includes a curved reentrant lip that seals against the pipe exterior. The ends of a clamping ring extending around the pipe may be engaged within the inset shoulders in the body to provide a secure but easily removed coupling to the pipe. Thus, with a small, low profile emitter structure having its valve configuration interior to the pipe wall, the pipe with preinstalled emitter may readily be laid down and taken up by automatic machinery. The emitter is not subject to fatigue from long term use, or from excessive temperature variations. It is substantially inert to the corrosive action of salts and other chemicals and nutrients that may be in the water.

In a different example of an emitter in accordance with the invention, the nodal body may comprise a deep drawn or formed metal element, which may be held in place by threads which engage the pipe wall. A resilient strip is mounted across an end face of the body to be deflected with a spring action relative to the plane of the end face, and the outer flange may include notches which may be used in inserting and removing the body. These emitters may be made by drawing a metal blank to the desired nodal configuration, forming the interior walls of the aperture within the end face, forming the resilient element and the mounting in the end face, threading the side walls of the nodal element and forming an exterior flange with tool receiving notches.

BRIEF DESCRIPTION OF THE DRAWINGS

A better understanding of the invention may be had by reference to the following description, taken in conjunction with the accompanying drawings, in which:

FIG. 3 is a top view of the emitter body of FIGS. 1 and 2, without the resilient strip;

FIG. 4 is a bottom view of the emitter body of FIGS. 1-3 without the resilient strip;

FIG. 5 is an enlarged fragmentary side view of a portion of the emitter, showing the valve action in response to changes in pressure in dotted lines;

FIG. 6 is a perspective view of a resilient strip used in the arrangement of FIGS. 1-5;

FIG. 7 is a perspective view, partially broken away, of a different configuration of an emitter in accordance with the invention;

FIG. 8 is a side sectional view of the emitter of FIG. 7;

FIG. 9 is a top view of the emitter of FIGS. 7 and 8; and

FIG. 10 is a fragmentary side sectional view of the emitter of FIGS. 7-9, showing variations occurring during operation thereof.

DETAILED DESCRIPTION OF THE INVENTION

Figure 1:
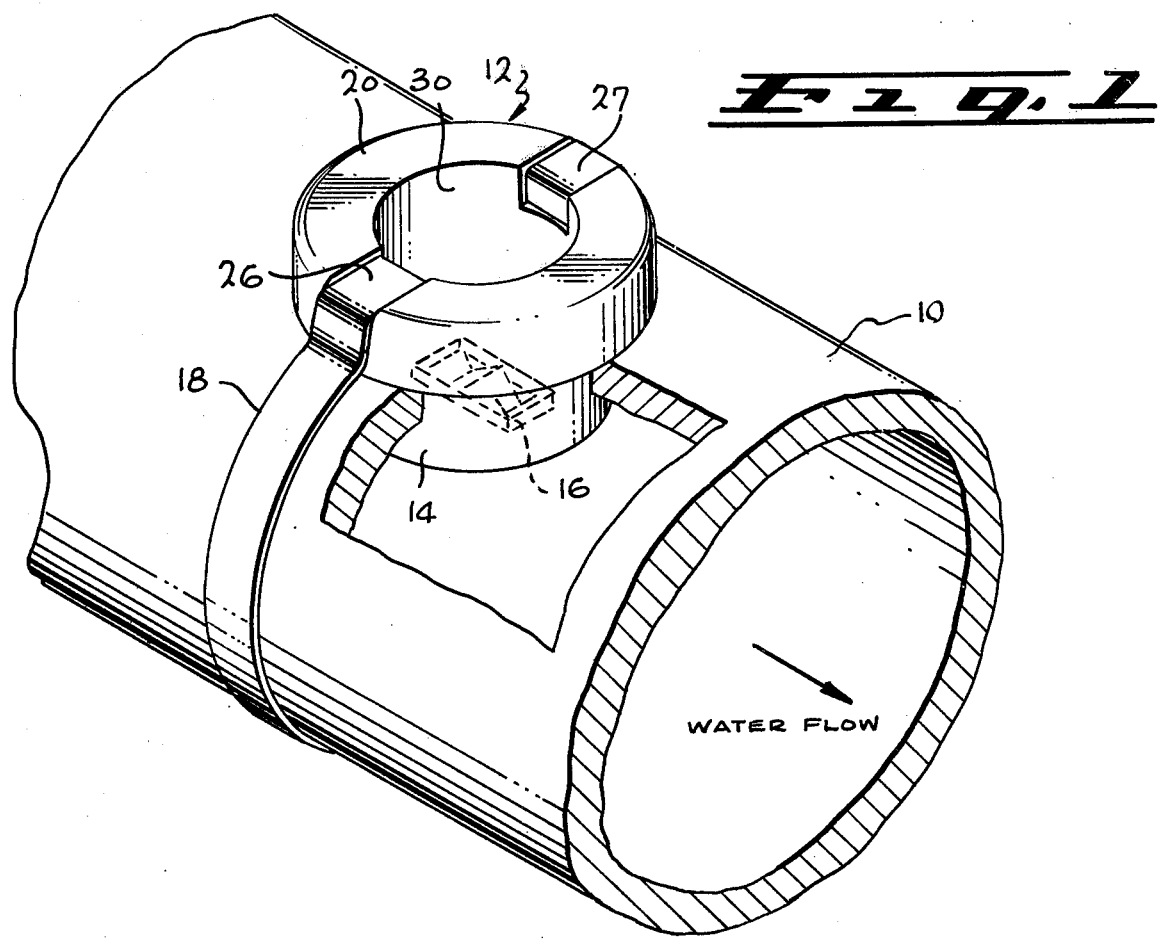
FIG. 1 is a perspective view, partially broken away, of an improved emitter for drip irrigation systems, shown installed in a portion of a pipe.

FIGS. 1-6 exemplify a general purpose emitter in accordance with the invention for above ground or under ground installation. This emitter may be adapted to provide low flow rates (e.g. 1-2 quarts per hour) if desired, and thus may be left on virtually continuously to provide highly efficient, low loss irrigation. A length of pipe 10, typically polyethylene tubing of the order of one-half inch in diameter, laid on the surface (or under ground), has emitters 12 spaced along its length at distances determined by variables such as the particular plantings, soil conditions and environment although the spacing is often of the order of 6 foot centers. Although the emitter may equally well be used with rigid PVC, copper, galvanized and other pipe, polyethylene is very widely used, typically in sizes such as ½" and ¾", because of its lower cost and pliant characteristic which permits long lengths to be coiled, and reeled out or in.

In accordance with the invention, referring now to FIGS. 1-6, each emitter 12 comprises a hollow cylindrical body 14, a resilient strip 16 disposed within an aperture in the body, and a spring clip 18 (seen only in FIG. 1) which firmly retains the emitter 12 in the pipe 10. The cylindrical body 14 may comprise an injection molded element of synthetic resin, such as Nylon or Noryl, and may be reinforced with glass or other fibers although the presently disclosed body is not fiber reinforced. A proportion of a low friction material such as molybdenum disulfide is incorporated for lubricating purposes described hereafter. With a nylon body, approximately 5% molybdenum disulfide has been found to be suitable. For one-half inch pipe, the body of the emitter 12 can be small, typically three-eighths inch in width by less than one-quarter inch in height, so that materials and handling costs with modern injection molding systems are extremely low.

The emitter body 14 is seated in an aperture in the pipe 10 with an upper flange 20 being the only protruding portion. The flange 20 has a reentrant curve portion defining an annular sealing lip 21 (best seen in FIG. 2) for engaging and seating against the outer surface of the pipe 10. When the emitter body 14 is in position, the pipe 10 is urged outwardly by water pressure to form an effective seal against the lip 21. The flange 20 also includes inset shoulders 23, 24 (best seen in FIGS. 1 and 3) having inside and top surfaces. The inside surfaces of the shoulders 23, 24 provide a seating surface for the ends 26, 27 of the spring clip 18, which ends may be angled inwardly to provide a gripping effect. The top surfaces of the shoulders 23, 24 provide grooves into which the spring clip 18 may fit at least partially, so as to aid in providing a low profile assembly.

Figure 2:
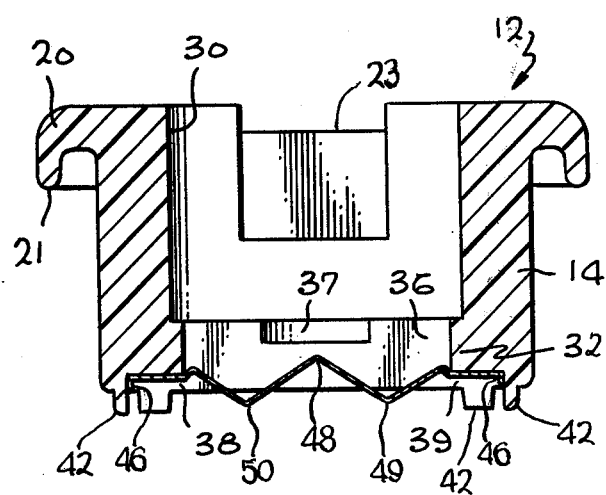
FIG. 2 is a side sectional view of the emitter of FIG. 1 shown before holding tabs on the body are turned down on the resilient strip.

The emitter 12 also includes (see FIG. 2 particularly) a hollow cylindrical stem 30 having a central bore and an integral end wall 32 that is perpendicularly disposed relative to the length of the stem. The end wall 32 includes a rectangular aperture 34 (visible in the top and bottom view of FIGS. 3 and 4 respectively) having parallel side surfaces 35, 36 at a predetermined spacing and with a predetermined depth. A recess 37 or cup depression in the end wall 32 and on the outer side of the emitter 14 (as viewed from the pipe interior when the emitter is installed) provides a different depth that determines the operative point for the flushing function. The recess 37 may be varied in depth relatively easily in conventional molding equipment, so as to enable selection of different flushing pressures. On the under side of the end wall 32 (also viewed from the interior of the pipe) shallow grooves 38, 39 are disposed between and in alignment with the planes which define the parallel aperture side surfaces 35, 36. The edges of these grooves 38, 39 provide locating surfaces for the ends and sides of the resilient strip 16, to insure correct placement and retention. The body is also formed with sets of tabs 42 extending from the under side of the end wall and disposed adjacent each side and end of the grooves 38, 39. The tabs 42, which are seen as originally molded in FIG. 2, are folded down over the ends 44, 45 of the resilient strip 16 under heat and pressure to anchor the strip 16 permanently in place, as seen in FIG. 5.

The resilient strip 16 is advantageously of heat tempered beryllium copper, and it is resistant to corrosion buildup of deposits. The width of the strip 16 is closely matched to the spacing between the parallel side surfaces 35, 36 of the aperture in the end wall 32, to provide a shearing action and a sliding fit between the edges of the strip 16 and the parallel side surfaces 35, 36. The intermediate portion of the strip 16 has a sinuous configuration including at least a double curvature, to provide variable deflection, in response to pressure, in a direction normal to the principal plane of the strip. As shown in FIGS. 2, 5 and 6, this sinuous configuration is provided by an approximately V-shaped central angle 48 and a pair of relatively smaller V side angles 49, 50, with the central V being oppositely disposed relative to the side V's. Each of the V angles has rounded corners and may be said to provide a nodal segment. A strip of material of the desired thickness, typically 3 mils in the present example may be formed and blanked in a single action, using a matched die assembly. End projections 46 angled at 90° to the terminal portions 44, 45 of the strip 16 are also included to provide firm seating of the strip. By leaving side webs when punching out the strip, a readily automated operation is provided which supplies both the desired precise width of the strip 16, and the desired curvatures along the length of the strip.

The complete body of the emitter 12 is formed on an automated or semi-automatic basis by feeding preformed strips 16 into position on the receiving grooves 38, 39 on the end wall 32 of the body 14. With the ends of the strip 16 held against the receiving grooves 38, 39, the adjacent tabs 42 on the end wall are bent over under heat, to seal the resilient strips 16 in position. As seen in FIG. 5, the strip 16 is retained in precise position relative to the aperture 34 (FIGS. 3 and 4 only) sides during this sealing operation by the end projections 46 from the terminal portions 44, 45 of the strip that are positioned within the bottom grooves 38, 39. When the strip is then anchored in place by the bent over tabs 42, sliding relative to the emitter body does not occur.

To install the emitter 12 in the pipe 10, a receiving hole matching the outer dimension of the stem 30 is provided in the pipe 10, either during extrusion of the pipe or by automatic or hand punching at an installation point or in the field. Because the pipe 10 is deformable, the aperture can in fact be slightly smaller than the stem 30 outer dimension. The emitter 12 is then simply inserted in the aperture, and the angled ends 26, 27 of the spring clip 18 are seated in the inside portion of the shoulders 23, 24 of the upper flange 20, by slightly distorting the clip at the same time as the pipe is slightly compressed. This can be done manually, although a seating tool can be used advantageously both for insertion and for removal purposes if it is desired to replace an emitter. The spring clip 18 is preferably relatively stiff, because the only bending action used is that employed during insertion and removal. When inserted and seated in this fashion, the rectangular aperture and resilient strip 16 are aligned with their elongated axes parallel to the direction of flow. Without significant pressure within the pipe 10, the nodal points of the smaller V angles 49, 50 extend slightly outside the adjacent end surface of the end wall 32, as best seen in the solid line position depicted in FIG. 2.

In operation, the emitter 12 adjusts its effective aperture area to compensate for static and dynamic changes in pressure. The shearing movement of the side of the strip member 16 relative to the deeper side walls 35, 36 of the rectangular aperture provides a controlled valve action that is uniquely advantageous for drip irrigation functions. The disposition of the strip member 16, and the functioning of this member relative to the sides 35, 36 of the aperture in the end wall 32, are best seen in the enlarged fragmentary view of FIG. 5. The unpressurized or nominal position of the strip member 16 is shown in solid lines. The V angled sections 49, 50 that provide protruding nodal segments are joined by the central oppositely angled V section 48 which protrudes outwardly relative to the interior of the pipe. In the nominal position of the strip element 16, the nodal segments of the V angles 49, 50 overlie the edge of the aperture side wall in the end wall 32 with a maximum spacing that is of the order of 1-3 mils in this example. As interior water pressure increases, to within the conventional operating range of 10-40 psi, the strip element 16 deflects outwardly relative to the pipe interior, to assume a position as illustrated by the dotted line "low pressure" position in FIG. 5. Thus the increasing pressure causes a compensating decrease in the cross-sectional area of the slit apertures, to maintain the output flow constant (here at the rate of about 2 quarts per hour) despite the increased pressure. The multiple curvatures supply the length needed for deflection of the strip element 16 without stressing of the material or requiring an "oil can effect". At the upper limit of the operating range, shown as the "high pressure" position, the transverse dimension of the slit apertures is at a minimum or the apertures are completely closed. Thus the emitter provides substantially constant flow despite pressure differences, and this is important in assuring uniform distribution of nutrients as well as water where liquid fertilizer or nutrients are fed into the system.

If, however, a substantial further increment of pressure is introduced, the further outward deflection of the strip member 16 causes the central V angle 48 to protrude outwardly (relative to the pipe 10) beyond the other (outer) surface of the end wall 32, at the recess 37. This now creates a central aperture which increases in size (cross-sectional area) as pressure increases, to establish a flushing, cleansing action. Because of the configuration of strip element 16 relative to the aperture walls, the flushing action can be initiated with as small a pressure difference as 5 psi above the upper limit of the normal operating range, but typically will be 10 psi or more greater. The higher flow velocity through the small flushing aperture of the emitter at this pressure provides sufficient force to tend to clear away particles, dirt and growth that may have accumulated, even though the aperture area is small and the actual volume flow rate low. The pressure drop at each emitter is very low, so that an irrigation system having a large emitter array does not require a high volume capacity pumping system for this remotely controlled flushing feature.

In practice, the slit apertures and the shearing valve action, together with the inclusion of the valving elements within the pipe interior, provide a greater degree of freedom from dirt and particle clogging than structures heretofore known. The inwardly protruding valve elements are exposed directly to the wiping action of the pipe flow, which is substantially parallel to their longitudinal axes. The flow path through the valve apertures is both short and direct. It should also be noted that the emitter may be flushed manually from outside the pipe, simply by inward deflection of the strip element 16, although it is preferred to utilize a tool of precise dimensions so as to limit the extent of movement and avoid permanent deformation of the strip element 16. A different flushing action may be used if desired, merely by opening the ends of the lines for a brief interval. In this mode, there is also a cleaning action arising from rapid movement of water across the face of the valve elements. A high pressure, high volume flow mode may also be used for certain irrigation purposes such as thoroughly wetting the surrounding earth to germinate newly planted seeds.

The sides of the resilient strip are disposed in close facing relation to the adjacent wall faces, which lie in planes parallel to the strip edges. By controlling the strip width and placement so that a sliding fit is established, the leakage contribution along the edges (apart from the nodal segments) is minimized. The sliding fit is improved by the presence of a substantial fraction of lubricating molybdenum disulfide in the molding compound. Emitters in accordance with the invention, constructed as disclosed herein, have excellent uniformity and can be manufactured with high yields.

A significant advance in economic terms is also achieved by emitters in accordance with the invention, in addition to the pressure compensating and remote flushing features. The emitters are very small, the example described here being approximately ⅜" in diameter at the flanged portion. However, the emitters are also extremely rugged and not subject to abuse in handling because they are mounted essentially flush with the exterior surface of a pipe, and with the interior strip element 16 in a protected position. Thus pipe with the preinstalled emitters may be coiled, fed out or in and handled manually or by automatic tube handling machinery. Further, the entire installation may be laid under ground without affecting the emitter functions. Depending upon the depth of installation and the type of soil, it may be desired to interpose a porous cover over the outer portion of the emitter, adjacent the outer flange, but this is not ordinarily required or needed.

In a different example of an emitter in accordance with the invention, the emitter 60 comprises a nodal or cup-shaped body 62 having a cylindrical threaded side wall 64 and an outwardly extending flange 66 at its open end. The flange 66 includes a pair of inset notches 68 into which projections from a mating tool (not shown) may be received for threading the emitter 60 in or out of the pipe 10. The substantially closed end of the emitter body 62, which is interior to the pipe 10, comprises an end wall 70 including a rectangular aperture 72. The emitter body, as is described in greater detail below, is preferably although not necessarily a unitary body, and in this example is formed from 15 mil phosphor bronze sheet. The end wall 70 after forming may be flat or slightly curved in the region of the aperture 72, and after forming has a reduced thickness of approximately 10 mils. As best seen in the top view of FIG. 9, the side faces 74, 75 of the end wall 70 that define the side edges of the aperture 72 are substantially flat and perpendicular to the plane of the end wall 70 to provide uniform reference surfaces for a shearing valve action. The end faces 77, 78 of the rectangular aperture 72 need not be as precisely formed.

A resilient strip member 80 is mounted to span the aperture 72 in the end wall 70, with opposite ends seated adjacent the end faces 77, 78, and with side edges closely abutting but not restrictively engaging the side faces 74, 75. The strip member 80 resiliently moves perpendicularly to the plane of the end wall 70 in response to changes in the water pressure in the pipe 10. This responsive characteristic is derived both from the usage of a relatively thin (3 mils in this example) beryllium-copper or other metal strip, and from the employment of a symmetrical double-curvature along the length of the strip member 70. The thickness and inherent modulus of elasticity of the material used are chosen along with the curvature to determine the range of water pressures over which control of flow rate is exercised, as well as the nominal flow rate itself. Preferably, the emitter is manufactured of metals from the class which includes the phosphor bronzes, beryllium-copper and the like. These metals are resistant to corrosion and are not subject to distortion or fatigue effects or from temperature changes. The double curvature used in the strip element 80 may have a wide variety of configurations, particularly to introduce specific and controlled types of flushing action. It will be appreciated that the strip element may be mounted outside or inside the end face of the body.

The device of FIGS. 7-10 may be manufactured by a sequence of simple, high speed and readily automated steps, principally effected on a multi-spindle eyelet machine. The body may be formed from a metal blank of a predetermined thickness, and from the selected class of materials. A single drawing or forming operation at ambient temperature is generally sufficient to obtain the relatively shallow depth needed for the nodal structure. The drawing step may at the same time provide the integral exterior flange. The following steps may be carried out in virtually any desired order, in forming the body. The side walls may be threaded, typically by a rolling technique. The rectangular aperture in the bottom of the total body, as well as notches in the flanges, may be inserted in a single stamping operation. It is found that stamping, if carefully executed, is adequately precise to form the side walls of the aperture for the shearing valve action that is utilized. If not, the first stamping may provide a slightly undersize aperture, and the side walls may then be ground to a precise dimension or a second stamping or pursuing action may be utilized to provide precise dimensional control.

The resilient strip may also be formed on a mass production basis. For precise transverse dimensions, a coil of the strip may be flat ground on each side with the desired accuracy, which may be to within ±1/10,000th of an inch. Thereafter, the desired strip segments, including double curvature, positioning shoulders and the like, may be successively stamped and concurrently or sequentially cut to size prior to or concurrently with insertion into the mating aperture in the body, and permanently coupled as by welding, soldering or other conventional techniques.

Whether the body is made of a synthetic resin or metal, the cost is relatively insignificant. Although readily producible and easily replaced structures have been described, it is evident that a wide variety of other mounting techniques may be employed, including fixed joinders, rigid mounts or special adapters for flexible or rigid pipe. The operative valving and flow controlling structure can perform its function independently of such variations. Although a low flow rate has been described because it has heretofore not been achieved, the emitter could by straightforward change of design and dimensions provide substantially higher flow rates. Similarly, different operative pressure ranges and flushing pressures could be utilized.

Although a number of variations, modifications and alternatives have previously been described, it will be appreciated that the invention encompasses all forms and variations falling within the scope of the appended claims.

What is claimed is:
1. An emitter for drip irrigation systems comprising:
a body having a flow aperture;
resilient means disposed in and substantially enclosing the flow aperture and deflectable through one range of positions to define with the body at least one flow aperture that diminishes in size with increased pressure to provide flow equalization for pressure variations over a predetermined pressure range, and being deflectable outside the range of positions to define with the body at least one different flow aperture to provide high velocity flushing flow at pressures above the predetermined pressure range.

2. The invention as set forth in claim 1 above, wherein the body has a wall bounding the flow aperture, and the resilient means is disposed in facing shearing relation to the wall to define a flow path area therewith; and deflects variably in response to pressure variations to provide diminishing flow path areas with increased pressure through the predetermined pressure range.

3. The invention as set forth in claim 2 above, wherein said resilient means comprises a resilient strip member having at least a double curvature and defining at least one slit aperture between the edge of a nodal segment of the strip member and a first edge of the adjacent wall, the aperture diminishing in size with increasing pressure through the predetermined pressure range.

4. The invention as set forth in claim 3 above, wherein said resilient strip member has a thickness substantially less than the thickness of the wall, an area coextensive with the aperture, and the edges thereof have a sliding fit relationship to the adjacent walls of the aperture, and is configured to define at least a second aperture between the edge of another nodal segment and a second edge of the wall when deflected outwardly by the interior pressure at levels above the predetermined pressure range.

5. The invention as set forth in claim 4 above, wherein the flow aperture is rectangular in area and has parallel side walls, and wherein the resilient strip member is secured to the body adjacent each longitudinal end of the flow aperture.

6. An emitter for drip irrigation systems comprising: a body insertable into an aperture in an irrigation pipe and extending into the interior of the pipe, the body having an end wall lying in a plane substantially parallel to the longitudinal axis of the pipe and an aperture in the end wall; and
a deflectable strip element mounted in the end wall and spanning the aperture, and configured to define at least one aperture between an edge of the end wall and a curved segment of the element.

7. The invention as set forth in claim 6 above, wherein the strip element has at least two oppositely curved portions, at least one of which protrudes beyond the interior edge of the end wall in the absence of interior water pressure to define a flow control aperture therebetween, the strip element deflecting in response to pressure within a selected pressure range to diminish the area of the flow control aperture.

8. The invention as set forth in claim 7 above, wherein at least one of the oppositely curved portions of the strip element protrudes beyond the exterior edge of the end wall in response to interior water pressure in excess of the selected pressure range to define a flushing aperture.

9. The invention as set forth in claim 8 above, wherein said strip element has a central V-shaped segment with the apex of the V being on the exterior side relative to the pipe and a pair of side V-shaped nodal segments having their apices on the interior side relative to the pipe, the side nodal segments protruding beyond the interior edge of the end wall in the absence of water pressure.

10. A low profile emitter for drip irrigation pipe comprising:
a hollow stem body partially insertable within an aperture in the pipe wall and having an apertured inner end wall, and an outer flange of greater cross-sectional area seating against the pipe exterior about the aperture therein;
a resilient strip member mounted to span the aperture in the end wall and deflectable to provide flow apertures varying in area in response to pipe pressure;
and means coupled to said body for engaging said body to the pipe.

11. The invention as set forth in claim 10 above, wherein said means for engaging said body to the pipe comprises a ring member engaging the body and at least partially encompassing the pipe.

12. The invention as set forth in claim 10 above, wherein said resilient strip member comprises a thin metal strip having at least a double curvature along its length, and wherein the flow apertures diminish in size to provide flow regulation through a selected pressure range.

13. The invention as set forth in claim 12 above, wherein the aperture in the inner end wall of the body is rectangular in shape, and defined by straight and parallel side walls, wherein the resilient strip member comprises a strip of metal of approximately 3 mils thickness coupled to the end wall adjacent each end of the rectangular aperture, and wherein the body is of molded plastic material.

14. The invention as set forth in claim 13 above, wherein the outer flange includes a reentrant peripheral lip engaging the outer wall of the pipe, and wherein the body includes molybdenum disulfide lubricant.

15. An emitter for drip irrigation applications, comprising:
a body mountable on the side of an irrigation pipe and including a flow aperture; and
a wall element coupled to the body and blocking the flow aperture therein, the wall element including an aperture having at least one interior wall surface, and the emitter further including a resilient element coupled to the wall element to span the aperture in the interior wall surface and with at least one peripheral edge in facing, shearing relation to the interior wall surface of the element, wherein the thickness of the wall element is greater than that of the resilient element, the peripheral edge of the resilient element having at least one curved portion and being deflectable normally relative to the wall element to define a slit aperture between the wall surface and the curved portion of varying cross-sectional area in response to the pressure within the pipe.

16. The invention as set forth in claim 15 above, wherein the wall element defines an aperture having a pair of spaced apart parallel interior walls and the resilient element comprises an element spanning the aperture and having side walls in facing, shearing non-contact relation to the interior walls of the wall element.

17. The invention as set forth in claim 16 above, wherein the resilient element has at least a double curvature along its length for allowing deflections in response to pressure without deformation of the resilient element.

18. The invention as set forth in claim 17 above, wherein portions of the curved resilient element project interiorly from the wall element within the pipe in the absence of interior pressure in the pipe, and said resilient element deflects in the direction outwardly from the pipe in response to a predetermined nominal range of operating pressures, to provide diminishing slit apertures in response to increased water pressure.

19. The invention as set forth in claim 18 above, wherein the outward deflection of the resilient element in response to an interior water pressure greater than the predetermined range causes a portion of the resilient element to penetrate at least partially outwardly across the wall of the aperture to provide a flushing aperture which increases in area with higher pressure thereafter.

20. The invention as set forth in claim 19 above, wherein the resilient element comprises a beryllium-copper strip of less than 5 mils in thickness and includes at least an integral pair of side span curvatures that are convex to the interior of the pipe and a central curvature that is concave relative to the interior of the pipe.

21. The invention as set forth in claim 20 above, wherein the resilient element has a length greater than that of the aperture of the wall element, and end portions abutting the end wall of the wall element adjacent the opposite ends of the aperture, the end portions each including at least one angled portion, and the end wall including integral means deformed at least partially over said end portions for securing said resilient element to the end wall.

22. An emitter for drip irrigation systems comprising:
a cylindrical element positionable in an aperture in the wall of a pipe, the element having an end wall defining a substantially rectangular aperture therein that is open to the exterior of the pipe and has facing side walls; and
a resilient element coupled to the end wall and spanning the aperture, with peripheral edges of the resilient element being disposed in substantially facing relation to the side walls of the aperture, the resilient element having a broad interior face area that receives water pressure within the pipe, and being deflectable outwardly in response to such water pressure.

23. The invention as set forth in claim 22 above, wherein the end face has a predetermined thickness, and the resilient element has a lesser thickness, and at least a double curvature along its length such that changes in water pressure cause a change in deflection of the resilient element in a direction normal to the plane of the end wall, such that a shearing valve action is established between the side edges of the resilient element and the facing side walls of the aperture.

24. The invention as set forth in claim 23 above, wherein the cylindrical element comprises a plastic element having a hollow stem and an outer flange, and wherein the emitter further comprises means coupling said body to the pipe.

25. The invention as set forth in claim 23 above, wherein the cylindrical element comprises an integral element having a threaded cylindrical side wall and an exteriorly extending flange on the end of the cylindrical side wall disposed apart from the end face.

26. The invention as set forth in claim 23 above, wherein the resilient element is of metal, and of approximately 2–5 mils in thickness.

27. The invention as set forth in claim 26 above, wherein the resilient element is of the class of metals consisting of phosphor bronze and beryllium-copper.

28. The invention as set forth in claim 27 above, wherein the resilient element includes a pair of symmetrical double curvatures about and along the plane of the end face, each end engaging a different end of the aperture.

29. The invention as set forth in claim 28 above, wherein the nominal spacing of the resilient element relative to the end face provides at least one slit aperture having a transverse dimension of no greater than 3 mils in the absence of interior water pressure, and wherein the flow rate through the valve is substantially less than approximately 2 gallons per hour for a pressure range of 10–40 psi, and wherein the cylindrical body is less than 1" in diameter.

30. An emitter for providing selected low liquid flow rates at substantially constant rates despite pressure variations, comprising:
wall means defining a side edge wall across which liquid may pass from the emitter; and
a resilient element having a broad face and a side edge, the side edge being disposed in adjacent facing and sliding fit relation to the side edge wall, the resilient element being coupled to the wall means and deflectable transversely to the side edge wall, with the side edge of the resilient element and the side edge wall defining a varying aperture in response to liquid pressure variations acting on the broad face to deflect the resilient element, wherein the resilient element is normally disposed to define a slit aperture with the inner side of the wall means and deflects outwardly under increasing pressure to diminish the slit aperture until water flow is substantially blocked therethrough, and further deflection outward establishes a slit aperture with the outer side of the wall means.

31. The invention as set forth in claim 30 above, wherein the resilient element comprises a relatively thin metal element and the wall means defines a relatively thicker side edge wall.

32. The invention as set forth in claim 31 above, wherein the resilient element has a curved surface permitting deflections without requiring stretching thereof, and with at least one curved segment thereof defining the varying aperture with the side edge wall.

33. An emitter for drip irrigation systems comprising:
a liquid pressure deflectable valve means comprising a body having an aperture and a resilient member disposed in the aperture and defining at least one flow aperture therewith, the resilient member being deflectable through a first range of deflection to establish pressure compensation over a predetermined pressure range to maintain substantially constant volume flow over the range, and the resilient member being deflectable through a deflection outside the first range to define at least one different aperture providing high velocity at a pressure level above the predetermined pressure range.

* * * * *

UNITED STATES PATENT AND TRADEMARK OFFICE
CERTIFICATE OF CORRECTION

PATENT NO. : 4,143,820
DATED : March 13, 1979
INVENTOR(S) : Elvin M. Bright, Sr.

It is certified that error appears in the above-identified patent and that said Letters Patent are hereby corrected as shown below:

Column 5, line 66, after "wall" (first occurrence) and before "in the" insert --36--. Column 9, line 60, after "V-shaped" and before "seg-" insert --nodal--.

Signed and Sealed this

Eighteenth Day of September 1979

[SEAL]

Attest:

Attesting Officer

LUTRELLE F. PARKER
*Acting Commissioner of Patents and Trademarks*